United States Patent [19]

Shiers et al.

[11] Patent Number: 4,718,796
[45] Date of Patent: Jan. 12, 1988

[54] BULK CROP TRANSPORTATION

[75] Inventors: William F. Shiers, Moose Jaw; John V. Cross, Saskatoon, both of Canada

[73] Assignee: Davaar Delphic Systems Limited, Regina, Canada

[21] Appl. No.: 35,432

[22] Filed: Apr. 7, 1987

Related U.S. Application Data

[63] Continuation of Ser. No. 683,029, Dec. 18, 1984, abandoned.

[51] Int. Cl.⁴ .............................................. B65G 53/34
[52] U.S. Cl. .................................... 406/34; 406/41; 406/43; 406/109; 406/123; 406/170
[58] Field of Search ............................. 406/23–25, 406/32, 33, 34, 38, 39, 41, 43, 56, 109, 124, 127, 139, 151, 152, 53, 61, 170; 414/303, 340; 222/58

[56] References Cited

U.S. PATENT DOCUMENTS

| | | | |
|---|---|---|---|
| 279,034 | 6/1883 | Smith | 406/109 |
| 2,116,603 | 5/1938 | Holly | 406/109 X |
| 3,876,260 | 4/1975 | Moss et al. | 406/152 X |
| 4,552,489 | 11/1985 | Jacobson et al. | 406/109 X |
| 4,580,928 | 4/1986 | Van Abbema | 406/43 X |
| 4,609,309 | 9/1986 | Aralt | 406/115 X |
| 4,659,262 | 4/1987 | Van Aalst | 406/43 X |

FOREIGN PATENT DOCUMENTS

| | | | |
|---|---|---|---|
| 2149647 | 4/1973 | Fed. Rep. of Germany | 406/152 |
| 768227 | 8/1934 | France | 406/109 |

Primary Examiner—Jeffrey V. Nase
Attorney, Agent, or Firm—Adrian D. Battison; Stanley G. Ade

[57] ABSTRACT

Two systems of transporting grain or other bulk crop employ a grain handling trailer incorporating a pair of weighing hoppers with a grain loading system for the hoppers and a grain discharge system. In one system the mobile grain handling truck visits storage containers in the production area and acts to weigh and grade the crop on site before discharging it into haulage trucks for delivery to a rail hub. At the rail hug a grade unloading apparatus is provided comprising a two-story enclosed building with the road trucks positioned vertically above and parallel to a section of rail on which rail cars can be positioned for receiving by gravity the discharged crop. In the second system the mobile grain handling trailer moves to a rail siding particularly convenient to the production area for on site weighing and grading the grain for direct delivery into rail cars positioned on the siding.

1 Claim, 8 Drawing Figures

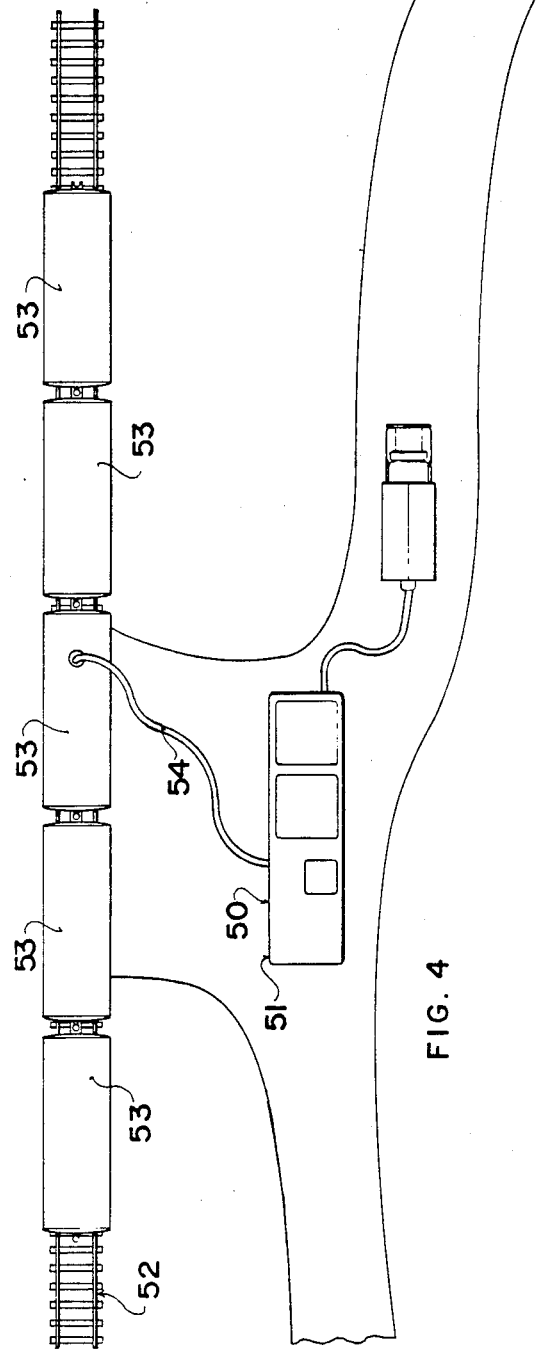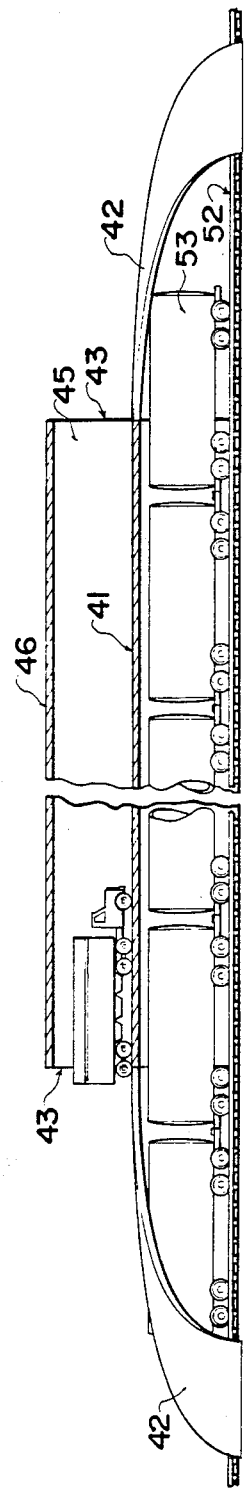
FIG. 4
FIG. 5

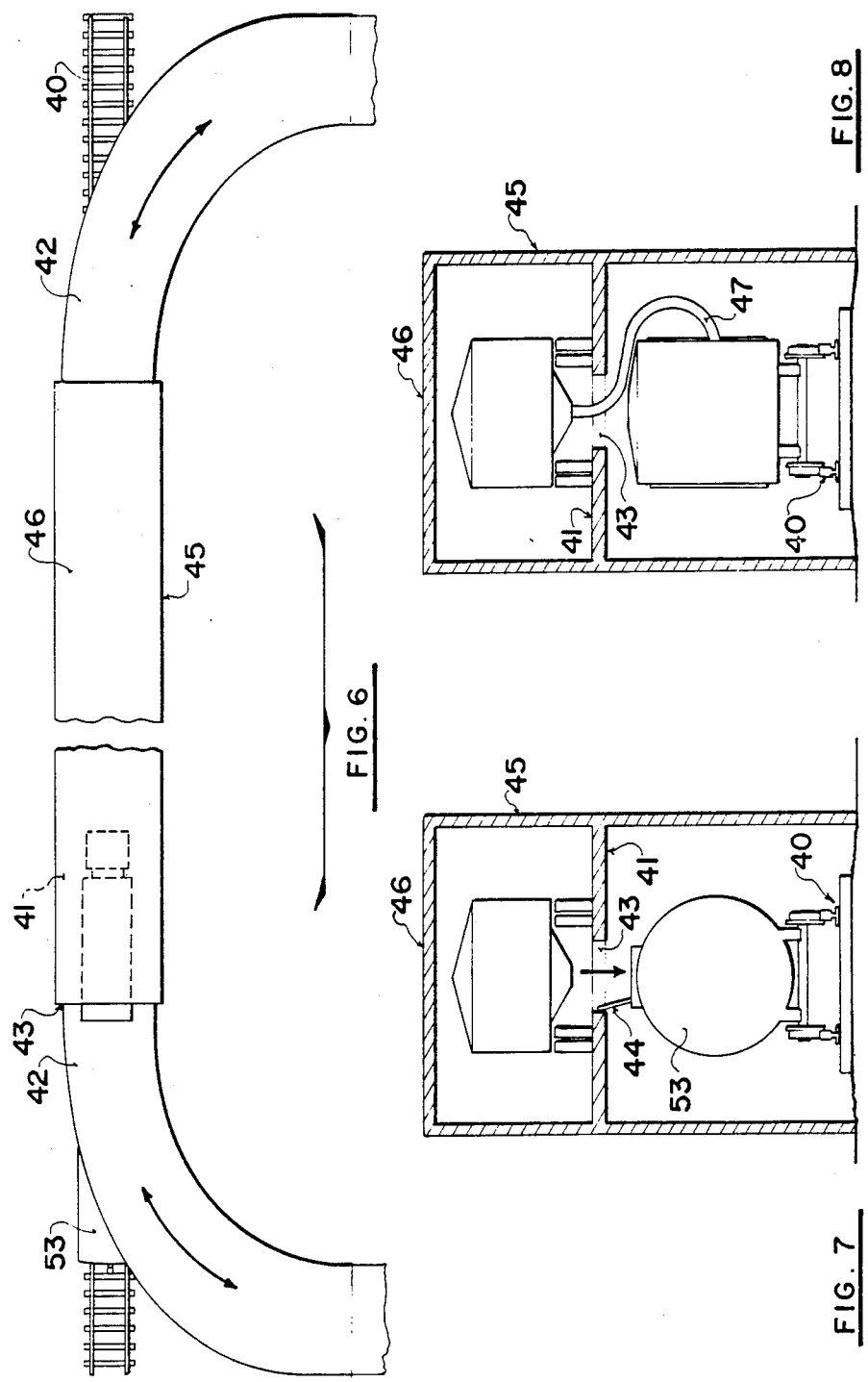

BULK CROP TRANSPORTATION

BACKGROUND OF THE INVENTION

This application constitutes a continuation application of my application, Ser. No. 683,029, filed Dec. 18th, 1984, now abandoned.

This invention relates to the transportation of bulk crops and particularly a system for transporting bulk crops from a production area to a transportation center.

There are a number of major grain growing areas in the American continent and each of these has the same problem which is one of transporting the produced grain from the production areas which are necessarily large and remote to a transportation center for sale and usually export.

Over the past 70 to 80 years grain production and productivity have increased substantially through the introduction of a multitude of agronomic advances. These have included improvements in growing practices, new developments in fertilizers, herbicides and insecticides, and in particular the introduction of improved grain varieties.

On the other hand the system for handling and transporting these commodities have remained essentially unchanged over this period. Under present practices, the farmers delivers his grain in his truck to the nearest line elevator of his choice. At the line elevator the grain is weighed, assessed for grade and dockage and in some cases where the necessary equipment is available the protein content is determined. Once these determinations are made and the required paperwork completed, the grain is elevated to in house bins allocated by commodity and grades and dockage within that commodity. The railway companies deliver empty box cars or hopper cars to the line elevator where they are loaded by the elevator operator. When loaded the railway company collects the cars and delivers them to larger local rail hubs to be assembled into trains designated for a convenient port or ports from which the commodity can be exported.

This is a simplistic description, but it does illustrate several weaknesses of the system. When the line elevator is full, the total system is plugged and the farmer is unable to deliver his grain. Also the present practice involves multiple handling of all grain.

However most importantly the present system poorly utilizes the capital assets of the system. The farmers grain truck, the line elevator, the rail equipment and particularly the rail line are all under utilized. The degree of utilization varies from region to region but in most cases the load factors are simply too low to justify the capital commitment especially when faced with escalating expenditures just to maintain the system.

Some advances have been introduced in recent years such as the use of hopper cars in place of the original box cars and also new line elevators have been constructed incooperating modern weigh scales and using computer systems for data processing. However essentially they perform the identical functions of their predecessors.

The pressures on the transportation systems of the grain producing areas are therefore becoming more and more evident. Export of grain is becoming increasingly important and is requiring increasing grain volumes while the transportation system can not or soon will not be able to accomodate the volumes.

SUMMARY OF THE INVENTION

It is one object of the invention therefore to provide a novel method for transportation of the bulk crops from the production area to a transportation center which allows a fully economic use of the capital equipment required.

According to a first aspect of the invention therefore there is provided a method of transporting bulk crops from a production area to a transportation center comprising moving a vehicle to a supply of the bulk crops, operating means mounted on said vehicle to extract bulk crop from the supply, weighing said crop in weighing means mounted on said vehicle, operating means mounted on said vehicle to transfer said crop from said weighing means to a bulk transport vehicle and transporting said crop in said transport vehicle to said transportation center.

According to a second aspect there is provided a method of transporting bulk crops from a storage container in a production area to a transportation center comprising moving a vehicle to the storage container, operating means mounted on said vehicle to extract bulk crop from the storage container, weighing said crop in weighing means mounted on said vehicle, operating means mounted on said vehicle to transfer said crop from said weighing to a bulk road transport truck and transporting said crop in said truck to said transportation center.

According to a third aspect there is provided a method of transporting bulk crops from a production area to a transportation center comprising moving a vehicle to a location adjacent to a railway line and convenient to the production area, transporting bulk crop to the vehicle from the production area in a bulk transport road truck, operating means mounted on said vehicle to extract bulk crop from the truck, weighing said crop in weighing means mounted on said vehicle, operating means mounted on said vehicle to transfer said crop from said weighing means to a rail car and transporting said crop in said rail car to said transportation center.

It is a further object of the invention to provide a novel apparatus for use in the methods defined above.

According to a further aspect of the invention therefore there is provided an apparatus for use in transporting bulk crops from a production area to a transportation center comprising a vehicle, means mounted on said vehicle for movement relative to the vehicle to a separate supply container of said bulk crop for extracting said bulk crop from said container, crop weighing means on said vehicle, means for directing extracted crop to said weighing means for weighing said crop and means on said vehicle for delivering the weighed crop to a location remote from said vehicle.

It is a yet further object of the invention to provide an apparatus for use in the second method specifically defined above for increasing the efficiency of unloading bulk transport road trucks into rail cars.

Accordingly the invention provides an apparatus for unloading a bulk transport road truck into a rail car comprising a section of rail truck on which rail cars can be positioned, and ramp means providing a section of roadway positioned vertically above and parallel to the section of rail track whereby material from the truck can be ejected downwardly under gravity from the truck to a rail car positioned vertically beneath the truck.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

BRIEF DESCRIPTION OF THE DRAWINGS

FIG. 4 is a schematic plan view illustrating a second system of grain transportation incorporating the mobile grain handling truck and grain hauling truck of FIG. 1.

FIG. 5 is a schematic side cross-sectional view of an apparatus for transferring grain from a road haulage truck to a rail car.

FIG. 6 is a plan view of the apparatus of FIG. 5.

FIG. 7 is cross-sectional view at right angles to FIG. 5 showing schematically the loading of a hopper car.

FIG. 8 is a view similar to that of FIG. 7 showing the loading of a box car.

In the drawings like characters of reference indicate corresponding parts in the different figures.

DETAILED DESCRIPTION

Figure 1:
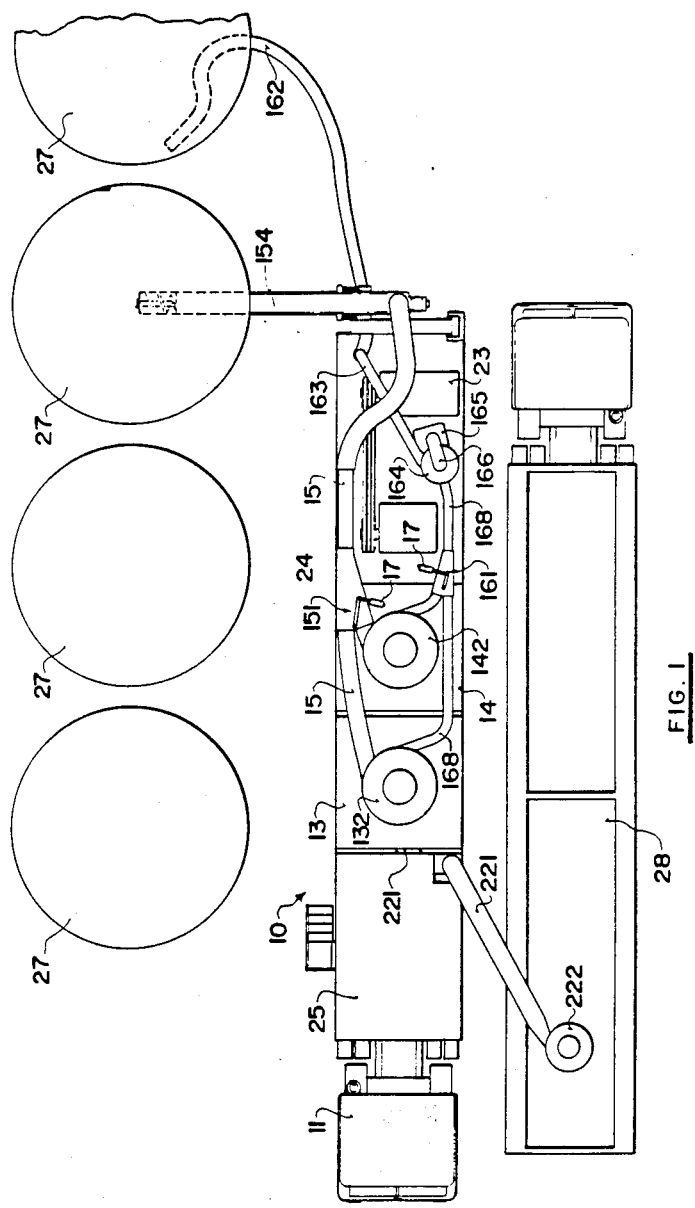
FIG. 1 is a plan view showing the first step in a transportation system including a mobile grain handling truck and a grain hauling truck at a storage site in the production area.

The central feature of the grain transporting systems as illustrated in FIGS. 1 to 3 and FIG. 4 is the mobile grain handling truck schematically illustrated and indicated at 10. The truck comprises a tractor 11 of conventional form and a semi-trailer 12 similarly of conventional form but of a structure tailored specifically to the requirements of the equipment carried as described hereinafter. The construction of the framework of the semi-trailer will be within the skill of one skilled in the art and hence will not be described in detail here.

Supported on the semi-trailer 12 are two grain bins 13 and 14. Each of the grain bins comprises a hopper section 131 into which grain can be collected from an input cyclone 132 of conventional form. The hopper section 131 is mounted on legs 134 which in turn are supported on load cells 136. Thus the load of grain present in the hopper section 131 can be weighed by the load cells 136 to provide an indication of the weight of grain within the hopper section 131.

The cyclone 132 which in well known manner acts to extract grain from a pneumatically conveyed stream of grain and air is supplied from two separate systems provided by a duct 15 and a second duct 16 both of which lead into the cyclone 132 in tangential manner.

The ducts 15 and 16 are both bifurcated at 151 and 161 respectively and incorporate respective flap valves 17 for controlling supply of the air and grain stream to one or other of the cyclones 132, 142 of the hoppers 13, 14 respectively.

The duct 15 is part of a pneumatic circuit incorporating an input compressor 152 connected to an input feed-line 151 which acts to extract grain from a screw conveyor or auger 154. The auger 154 is mounted upon an arm 155 pivotally mounted at 18 and movable by a cylinder/piston 19 so that the position of the remote end of the auger 16 can be controlled. In addition the angle of the auger relative to the arm 155 can be controlled by a cylinder/piston 20 so the auger can be positioned conveniently within a supply of grain for lifting the grain from the supply up to the inward end of the auger 154. The auger 154 is driven by a hydraulic motor 21 positioned at the upper end. The inlet duct 151 communicates with the auger 154 at the upper end so as to drive grain at the upper end into the duct 15 for supply to one or other of the hoppers 13, 14 in dependence upon the position of the flap valves 17.

The duct 16 is similarly fed with a stream of air from a pneumatic vacuum extraction system. The system comprises a vacuum hose 162 which can be manually positioned to extract grain from a supply. The hose 162 is of flexible construction and connects with a rigid section 163 communicating tangentially with the upper section of a cyclone 164 from which air is extracted by a vacuum pump 165 through a duct 166 communicating with the upper face of the cyclone 164. Thus the pump 165 acts to draw air through the cyclone from the flexible vacuum hose 162 to draw grain from the supply into the cyclone in which it is collected and then passes through a rotary air lock 167 of conventional form into the duct 168 at the bottom of the cyclone 164.

An output system from the truck comprises an output compressor 22 feeding an output duct 221 which passes adjacent rotary air locks 137 of the hoppers 13, 14. Thus grain from one of the hoppers 13, 14 can be deposited into the duct 221 for ejection from the duct through a discharge cyclone 222 of conventional form.

An engine 23 to provide power for the compressors 22 and 152 and also the vacuum pump 165 is provided at the rear of the truck. The engine can also provide electrical power for controlling the flap valves 17 as well as other valves such as the rotary valves on the cyclones. A manually or remotely operable sampling door 24 may be provided in the duct 15 for collecting a sample of the grain as it is passing to one of the hoppers 13, 14. A control or office section 25 is positioned adjacent the front of the trailer beneath the discharge duct 221 and this office section can be provided with information from the weigh scales or load cells 136 and may include the necessary computing and recording systems together with conventional grain sampling equipment so that a record can be made of the grain within the hoppers 13, 14, it weight and parameters.

Figure 2:
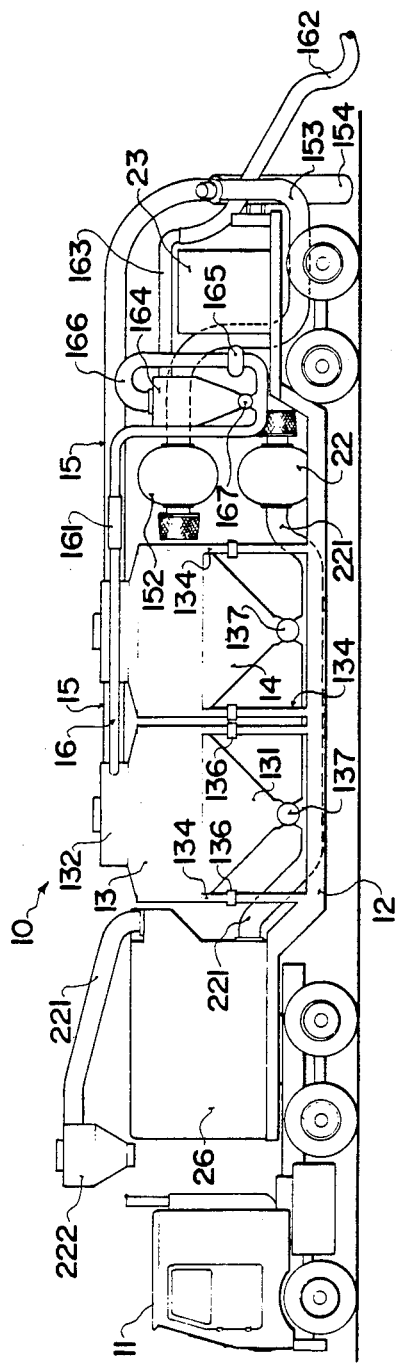
FIG. 2 is a side elevational view of the mobile grain handling truck of FIG. 1.

The apparatus of FIG. 2 is modified from that of FIG. 1 in that the office or control section is removed from the trailer and positioned in a separate vehicle (not shown) and the front section of the trailer is used as a cleaning section for cleaning grain passing in the duct 221 into the section 26 for cleaning from which it is extracted by the discharge duct also indicated at 221. The cleaning section 26 is shown only schematically since the construction is of a conventional form. In this way those farmers who wish to retain the screenings from their grain have the option of doing so.

An important element of the design of the system in addition to its mobility is that all grain connections, conveyors, hoses and outlets are smooth and continuous so as to minimize the danger of clogging and to minimize any damage to the grain in the transfer operations.

Some grains particularly when the moisture content is high tend to bridge out and not flow readily from the grain bins 13, 14. Thus these bins may be fitted with vibrators (not shown) to be used when necessary to facilitate the complete emptying of the bins.

Figure 3:
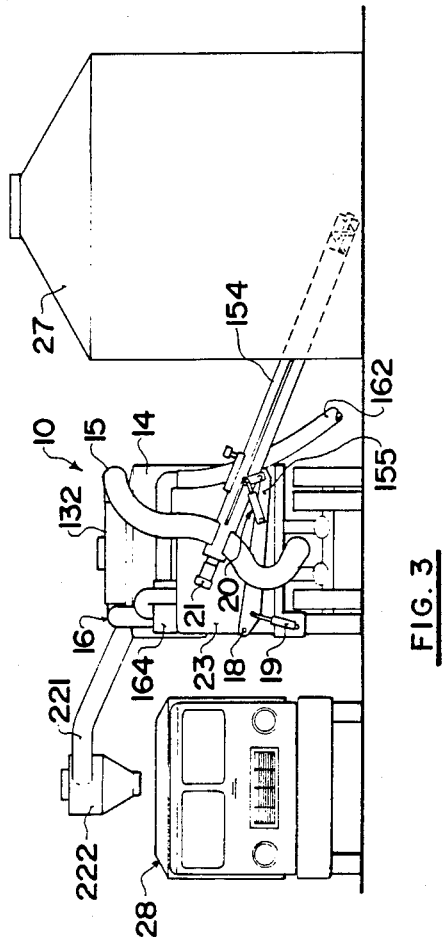
FIG. 3 is a rear elevational view of the apparatus illustrated in FIG. 1.

In operation of the grain handling truck in the method as shown in FIGS. 1, 2 and 3, the truck is drawn to a position adjacent a plurality of grain bins indicated schematically at 27. Grain from the farmer's grain bin 27, or other grain deposit, is transferred from the grain bin by means of the main screw conveyor or auger 16 onto the back of the trailer and then transferred pneumatically into one or the other of the bins 13, 14. When the bin is full, the flap valve 17 is operated so that the other bin continues to be filled. The weight of the grain bin is then measured by the load cells 136. The grain from the full bin is then transferred pneumatically into a grain hauling trailer of conventional form schematically indicated at 28. Loading and unloading of the bins 13, 14 continues alternately in this way with the weight of each full bin being measured by the load cells and recorded in the control section 25.

When the main screw conveyor 16 has removed as much grain as is possible from the grain bin 27, the conveyor is transferred to the next grain bin to load its contents into the trailer and thence to the haulage trailer 28. The residual grain in the bottom and corners of the first grain bin 27 is tranferred to the trailer pneumatically by means of the clean-up vacuum hose 162. All the farm grain bins to be emptied are unloaded sequentially in this manner and loaded onto one or more grain hauling trailers 28 via the grain handling trailer 10.

The control section or office 25 houses the visual readout and the printer for the weigh scales 136. The room also contains the equipment and apparatus for the performance of analytical tests required to establish the quality and grade of the grain being handled as sampled from the line 15 by the sampling port 24 or sampled manually from the bin 27. These tests include moisture and protein determination, seed analysis, and dockage determination by a standard procedure such as that performed by the Carter Dockage Tester. The control area or office also provides clerical space for the keeping of regulatory records, the inspection of permit books, and a mobile telephone to communicate with the company office, grain farmers, and grain delivery points.

It should be noted that the system provides a continuous, closed transfer route from the farm grain bin to the grain hauling trailer, thus essentially eliminating dusting and the associated environmental contamination. This is particularly important in controlling or eliminating the inadvertent spreading of weed and other seeds. For this reason also in addition to climatic protection, the grain hauling trailer is an enclosed unit to prevent spread of seeds during highway travel.

Each of the grain bins 13, 14 of the grain handling trailer accomodates for example 300 bushels of grain. The auger 16 may have a capacity of the order of 125 tonne per hour with the pneumatic system provided by the vacuum hose 162 having a capacity of the order of 160 tonne per hour.

In the system illustrated in FIGS. 1, 2 and 3, the grain handling trailer forms part of a team including for example 5 hauling trailers 28. In accordance with a scheduled arrangement, the team of trailers visits a particular farm or storage facility. Using the loading system on the grain handling trailer, grain is transferred from the storage container into one of the bins on the trailer. During loading, representative samples are taken and analyzed in the control room. With the weight of the grain confirmed and the analysis of the grain complete, the usual business agreement can be transacted between the producer and the grain collecting agency with the necessary data recorded in the control room. The grain is then loaded into the road haulage trailers which may be of 40 ton capacity. When the loading of the grain at the facility concerned is complete, the grain handling trailer then can move to the next location in prearranged manner. Meanwhile the road haulage trucks deliver the loaded grain to a central transportation hub and then return to meet the grain handling trailer at the next destination.

An apparatus for assisting in the unloading of the grain from the road haulage trailers into rail cars is illustrated in FIGS. 5 through 8. The apparatus comprises a section of rail 40 along which a number of rail cars can be positioned by being drawn into the section for example as part of a longer train. A section of roadway or ramp 41 is positioned vertically above the rail section 40 and substantially parallel thereto so that the ramp or roadway extends along the section 40 to allow the positioning of a plurality of trailers above the rail cars on the section 40. Ramps 42 are positioned at the ends of the raised section of roadway 41 to enable the trucks to be readily driven onto and removed from the raised section. A building structure 43 is positioned around both the rail section 40 and the raised roadway 41 so that a transfer of grain can take place without interference from environmental conditions. The necessary structure of supports for the raised roadway 41 and for the surrounding enclosures are not shown in the drawings as they will be within the skill of one skilled in the art. It suffice to say that the enclosure effectively provides a two-storey building with the trucks housed in the upper and the rail cars in the lower section with both the upper and lower sections being fully enclosed apart from entry and exit openings at the ends.

As shown in FIGS. 7 and 8 the upper roadway 41 is provided with a central slot 43. The height of the roadway 41 relative to the rail 40 is such that the upper door 44 of a hopper car 45 can be opened to lie within the slot to expose clearly the upper opening through which the hopper car can be filled. In this way a truck driver can accurately locate his truck relative to a hopper car for direct discharge under gravity of grain from the truck into the hopper car.

The enclosure for the structure is shown in FIGS. 7 and 8 as incorporating side walls 45 and a roof 46 whereby both rain and wind are prevented from interfering with the discharge of the grain.

The same apparatus can be used for loading box cars which as is known conventionally have a side opening. In this case an additional flexible hose 47 is connected to the grain truck and communicated through the open door of the box car for directing grain into the box car under gravity.

This arrangement provides a very low cost and fast procedure by which to transfer grain from a road vehicle to a rail car. The capital costs of the system are substantially less than for conventional elevators. In addition the operating costs are effectively zero since the transfer process occurs by gravity and under direct control of the truck operator. It should also be noted that the gravity transfer operation is very gentle and causes no damage to the grain in contrast to the possible damage caused by repeated elevator handling.

Clearly the efficiencies of this system are maximized when used by fairly large capacity trucks. However it can also be used by smaller road vehicles such as farmer's trucks with considerable cost efficiency. However when the apparatus of FIGS. 5 through 8 is used to receive grain which has not been weighed and graded by the grain handling truck of FIGS. 1 to 3, it is necessary for the transporter to know the weight and grade of the grain. This can be determined at another location or alternatively a weigh scale and grain analysis laboratory may also be located at the truck unloading station.

The truck unloading station of FIGS. 5 through 8 can be positioned at a central railway hub on a main railway line thus avoiding the necessity for maintaining and using minor branch lines. In addition the central loading arrangement will reduce the requirement for railway cars to be widely distributed which in turn will reduce the turn-around time of a car between the loading point and the export port. It will of course be appreciated that any decrease in the turn-around time will provide a reduction in the total number of cars required.

The system described above eliminates the need for the grain farmer to have his own road licensed truck to deliver to a line elevator. In addition the system reduces the multiple handling of grain as used in the present traditional system. A yet further advantage is that the increased flexibility of the system prevents the system from becoming plugged as can happen when a particular line elevator is full in the present traditional system.

The proposed system is extremely cost effective. Not only is the system much less expensive to build and operate than the components of the present traditional system, being mobile, the system makes very efficient use of capital assets. This cost effectiveness is particularly evident in areas where the rail line component of the existing system is in pressing need of rehabilitation. Rail line rehabilitation costs are indeed staggering, of the order of several hundred thousands of dollars per mile, and are escalating rapidly. The proposed system provides an alternate procedure which obviates the expenditure of such vast sums while at the same time providing the same functions as the present practice but more efficiently and at lower cost.

It will be appreciated that large numbers of grain hopper cars are dedicated to the movement of grain to export position. These hopper cars are expensive, costing approximately $80,000 per unit. Any procedure which increases the efficient utilization of these cars is clearly advantageous. The present invention does this. By delivering grain to a railway hub, the MPES eliminates the need for railway hopper cars to travel from the railway hub to the grain growing area previously served by a line elevator. The number of "hopper-car-days" saved in this manner is considerable. By way of illustrative example, it is generally recognized that a one-day reduction in the turn-around time of a hopper car delivering grain in Canada from the Prairies to Vancouver is equivalent to a reduction in the total hopper car fleet of 600 hopper cars.

Further, if the railway hub to which the grain hauling trailer delivers the grain is in fact an elevator equipped with cleaning facilities, as may expected to be the case in certain instances, then the present invention also provides the opportunity to clean the grain to export standards prior to transportation to export position. This provides a further reduction in the number of hopper cars for a given volume of grain transported since the dockage, which averages around 10% of the grain, is now no longer part of the shipment. This approach offers the further advantageous possibility of transporting the grain, now at export standard, to export position by unit train.

Turning now to FIG. 4, there is shown a modified system of grain transportation employing the mobile grain handling trailer of FIGS. 1 through 3. The grain handling trailer is schematically indicated at 50 with its related tractor unit at 51. In this system the trailer is moved to a location convenient to a suitable railway branch line indicated at 52. In accordance with the method of train of grain cars is positioned on the railway line adjacent the grain handling trailer 50, the cars being indicated at 53.

The outlet connection from the trailer 50 schematically indicated at 54 is in this system of sufficient length to reach any of the five rail cars 53.

Grain from the producing area is transported a relatively short distance to a most convenient pick-up point adjacent to rail line in the conventional farm truck. The mobile grain handling trailer 50, as explained previously in connection with FIGS. 1 through 3 unloads the grain from the farm truck, grades and weighs the grain and then discharges the grain into one of the five rail cars in accordance with the type and characteristics of the grain.

This system clearly provides a more economical method for the producer to place his grain into the national transportation system. With increased transportation expenses it is advantageous to minimize the necessary distance to the delivery point. The system can be located adjacent to any rail siding which can accomodate rail cars and which provides a small amount of space to park the mobile grain handling trailer. These locations are numerous and are selected to be closer than established terminals to a large number of farmers. In practice the railway company will deposit a prearranged number of cars at the prearranged site and pick them up when loaded with no intermittent movement of the cars required.

It will be appreciated that the mobile grain handling trailer which is the central feature of the systems is not intended to have any grain transporting function and hence the hoppers 13, 14 are not intended and not designed as transportation hoppers. Thus weighed grain is dispensed directly from the weighing hoppers into a transportation system provided either by rail cars or by road haulage trucks.

Reference is made throughout this specification to use of the system for transportation of grain, but it will of course be apparent that it can be used for transporting any other bulk crop.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

We claim:

1. An apparatus for use in transporting bulk crops from a production area to a transportation center comprising a vehicle having road wheels by which the vehicle can be transported to a bulk crop storage container in the production area, extracting means mounted on said vehicle for movement relative to the vehicle to said storage container of said bulk crop for extracting said bulk crop from said container, said extracting means comprising a screw auger having an auger tube and an auger flight mounted therein and means mounting the auger tube for movement relative to the vehicle from a storage position to a collection position projecting outwardly from the vehicle for engaging said bulk crop and a vacuum suction system including a hose separate from said auger tube and movable separately therefrom and relative to the vehicle so as to engage said bulk crop, and fan means for generating an air flow in said suction hose, crop weighing means mounted on said vehicle and comprising a first and a second weigh hopper, duct means for transporting said collected crop from said auger tube and from said suction hose for transportation of said crop to one or other of said weigh hoppers, means in said duct means for controlling feed of said crop to a chosen one of said hoppers, means for measuring the weight of material in each of said hoppers, each of said hoppers having air lock means at a bottom thereof operable to discharge crop in said hopper therefrom into a discharge duct, cleaning means for receiving said crop from said discharge duct and for extracting dockage therefrom, and a discharge assembly comprising a duct member pivotal about a vertical axis such that it is movable to one side of the vehicle and including a cyclone for discharging the crop downwardly into a bulk transport trailer for transportation.

* * * * *